(12) United States Patent
Fang et al.

(10) Patent No.: US 9,052,406 B2
(45) Date of Patent: Jun. 9, 2015

(54) PROCESSING AZIMUTHAL MEASUREMENT DATA

(75) Inventors: Sheng Fang, Houston, TX (US);
Zhiqiang Zhou, Houston, TX (US);
Paul G. Cairns, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 416 days.

(21) Appl. No.: 13/525,630

(22) Filed: Jun. 18, 2012

(65) Prior Publication Data
US 2013/0338924 A1    Dec. 19, 2013

(51) Int. Cl.
*G01V 3/18* (2006.01)
*E21B 47/024* (2006.01)
*G06F 17/18* (2006.01)
*G01V 3/36* (2006.01)

(52) U.S. Cl.
CPC .. *G01V 3/18* (2013.01); *G01V 3/36* (2013.01); *G01V 2200/16* (2013.01); *E21B 47/024* (2013.01)

(58) Field of Classification Search
CPC ....... G01V 3/18; G01V 2200/16; G01V 9/00; G06F 17/18; E21B 47/024
USPC ........... 702/7, 1, 9, 11–13, 81, 127, 150–153, 702/178, 189; 703/2, 5, 10; 324/323, 324/332–335, 337–339, 344–346, 347–348, 324/351; 166/255.2; 340/853.4–853.6, 340/853.8, 856.1
See application file for complete search history.

(56) References Cited

U.S. PATENT DOCUMENTS

| | | | |
|---|---|---|---|
| 6,819,111 B2* | 11/2004 | Fanini et al. ................... | 324/339 |
| 7,114,565 B2* | 10/2006 | Estes et al. ................. | 166/255.2 |
| 8,117,018 B2 | 2/2012 | Fang et al. | |
| 2006/0125479 A1 | 6/2006 | Chemali et al. | |

OTHER PUBLICATIONS

Radtke R. J. Improved Formation Evaluation Through Image-Derived Density, SPWLA 44th annual Logging Symposium, Jun. 22-25, 2003, pp. 1-14, Sugar Land, Texas.

* cited by examiner

*Primary Examiner* — Toan Le
(74) *Attorney, Agent, or Firm* — Cantor Colburn LLP (57) ABSTRACT

A method of processing azimuthal measurement data includes: receiving a plurality of data values generated by a rotating measurement tool, the measurement tool including at least one measurement sensor and configured to rotate and measure a signal at each of a plurality of azimuthal orientations; associating each received data value with an azimuthal orientation; selecting one or more data values that provide sufficient information regarding a measured signal, each of the selected data values having an associated azimuthal orientation; disregarding azimuthal orientations associated with one or more data values that provide insufficient information regarding a measured signal; and fitting only the selected data values to a sinusoidal curve.

20 Claims, 5 Drawing Sheets

PROCESSING AZIMUTHAL MEASUREMENT DATA

BACKGROUND

Logging-while-drilling (LWD) tools are commonly used for determination of properties of formations surrounding a borehole. These logging tools provide various types of measurements, such as resistivity and gamma ray measurements, that can provide imaging data and can be interpreted to evaluate properties of the formation, including hydrocarbon liquids and gases, and other fluids therein.

During LWD operations, erratic tool motion or low rotational rates during the logging process can cause poor accuracy in measurement of signals. For example, stick-slip behavior and low RPM behavior in LWD assemblies can reduce the accuracy of azimuthal propagation resistivity measurements due to missing or invalid raw records in some of the azimuthal sectors. Conversely, azimuthal propagation resistivity logs may appear "noisy" when in fact they just reflect erratic tool motion or low RPM. Subsequent interpretation for distance to bed boundary and formation dip may be affected adversely.

SUMMARY

A method of processing azimuthal measurement data includes: receiving a plurality of data values generated by a rotating measurement tool, the measurement tool including at least one measurement sensor and configured to rotate and measure a signal at each of a plurality of azimuthal orientations; associating each received data value with an azimuthal orientation; selecting one or more data values that provide sufficient information regarding a measured signal, each of the selected data values having an associated azimuthal orientation; disregarding azimuthal orientations associated with one or more data values that provide insufficient information regarding a measured signal; and fitting only the selected data values to a sinusoidal curve.

A system for imaging a formation surrounding a wellbore during a drilling operation includes: a drill string comprising a downhole measurement tool configured to rotate, the downhole measurement tool including at least one measurement sensor and configured to measure a signal at each of a plurality of azimuthal orientations; and a processor configured to perform: receiving a plurality of data values generated by the measurement tool; associating each received data value with an azimuthal orientation; selecting one or more data values that provide sufficient information regarding a measured signal, each of the selected data values having an associated azimuthal orientation; disregarding azimuthal orientations associated with one or more data values that provide insufficient information regarding a measured signal; and fitting only the selected data values to a sinusoidal curve.

A computer program product for processing measurement data includes a non-transitory tangible storage medium readable by a processing circuit. The storage medium stores instructions for execution by the processing circuit for performing a method including: receiving a plurality of data values generated by a rotating measurement tool, the measurement tool including at least one measurement sensor and configured to rotate and measure a signal at each of a plurality of azimuthal orientations; associating each received data value with an azimuthal orientation; selecting one or more data values that provide sufficient information regarding a measured signal, each of the selected data values having an associated azimuthal orientation; disregarding azimuthal orientations associated with one or more data values that provide insufficient information regarding a measured signal; and fitting only the selected data values to a sinusoidal curve.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

A method of processing azimuthal measurement signals is provided that compensates for missing azimuthal sectors in sinusoidal curve fitting of azimuthal measurements. An improved sinusoidal curve fitting is performed on only the actually measured data values of the azimuthal propagation resistivity signal at corresponding toolface angles, while disregarding sectors for which insufficient data has been collected. In one embodiment, measurements are made at a plurality of angular sectors over a single rotation of the tool, i.e., over 360° rotation. In another embodiment, measurements can be recorded at arbitrary toolface angles as long as the angles are known. The bias removal/sinusoidal curve fitting methods described herein may be used in conjunction with measurements made with either a single transmitter or multiple transmitter (e.g., dual transmitter) arrangements, and may be used in conjunction with in-phase and/or the quadrature signal components. The systems and methods described herein smooth the effect of random noise and greatly reduce the effect of tool bias, including those caused by missing or invalid raw records in some azimuthal sectors.

Figure 1:
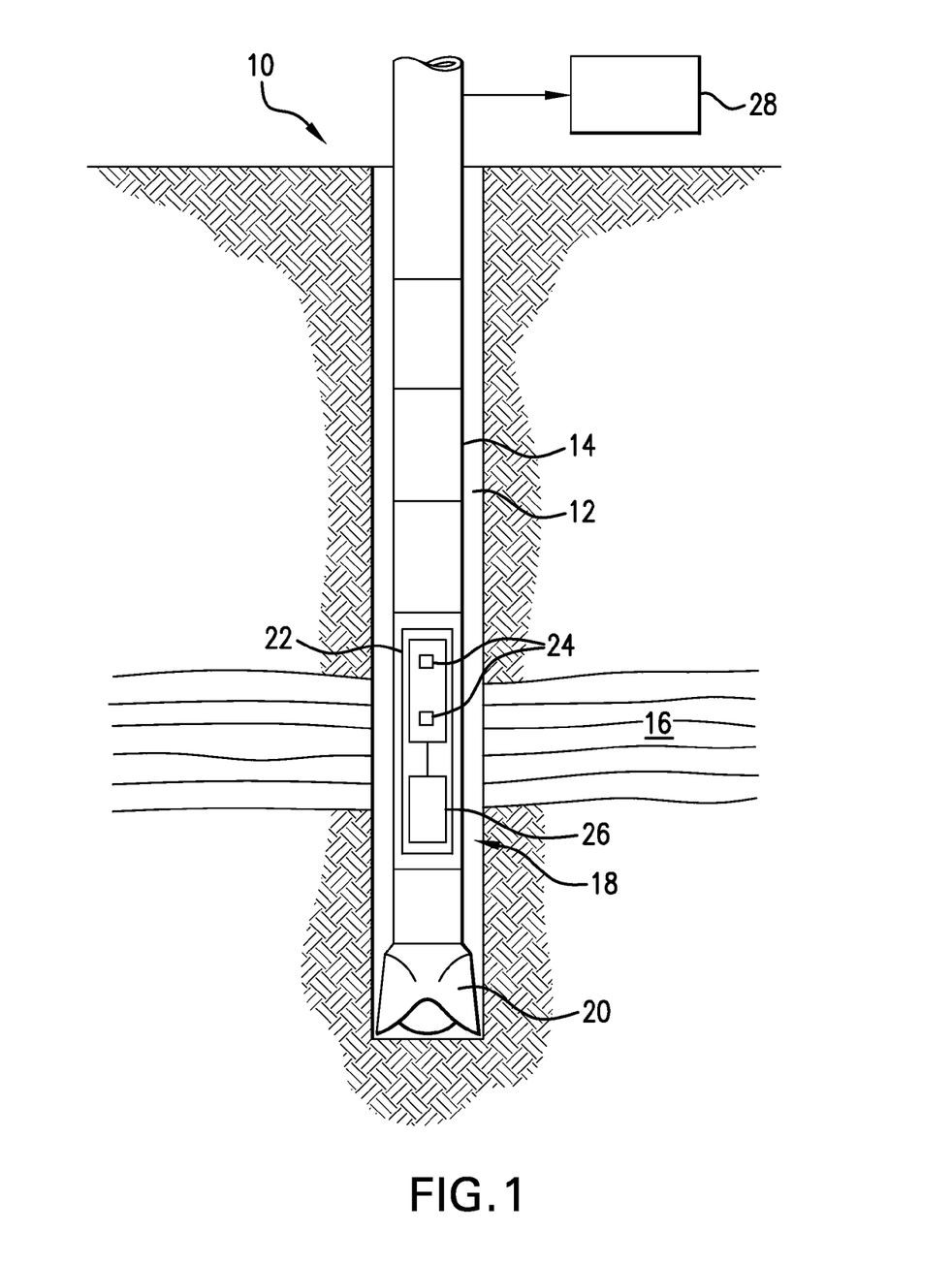
FIG. 1 illustrates an exemplary embodiment of a system including a drillstring and a measurement tool.

Referring to FIG. 1, an exemplary embodiment of a downhole drilling, well logging, formation evaluation and/or completion system 10 disposed in a borehole 12 is shown. A borehole wing such as a drill string 14 is disposed in the borehole 12, which penetrates at least one earth formation 16. The drill string 14 is made from, for example, a pipe or multiple pipe sections. The system 10 and/or the drill string 14 include a drilling assembly 18. The drilling assembly 18, which may be configured as a bottomhole assembly (BHA), includes a drill bit 20 that is attached to the bottom end of the drill string 14.

The drill string 14 and/or the drilling assembly 18 generally include equipment such as a logging tool 22 for taking measurements downhole of the borehole 12 and/or the formation 16. As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging. As referred to herein, "downhole" or "down a borehole" refers to a location in a borehole away from a surface location at which the borehole begins. "Depth" refers to a location along a longitudinal axis of the borehole away from the surface location.

The logging tool 22 may be disposed in the system 10 at or near the downhole portion of the drillstring 14, and includes one or more of various types of sensors or receivers 24 to measure various properties of the formation 16 as the tool 22 is lowered down the borehole 12. Such sensors 24 include, for example, resistivity sensors, nuclear magnetic resonance (NMR) sensors, porosity sensors, gamma ray sensors, seismic receivers and others.

The logging tool 22 may include downhole electronics 26 for at least one of operational control and data analysis. The downhole electronics 26 may receive input from one or more sensors 24, and can perform functions such as data analysis, data storage and data transmission, as well as receiving and/or transmitting control signals. The downhole electronics 26 may include components such as a power supply, a processor, memory, storage, communications interfaces and others.

A processing unit 28 is connected in operable communication with the drilling assembly 18 and/or logging tool 22, and may be located, for example, at a surface location, a subsea location and/or a surface location on a marine well platform or a marine craft. The processing unit 28 may also be incorporated with the drill string 14 or the logging tool 22, or otherwise disposed downhole as desired. The processing unit 28 may be configured to perform functions such as controlling the drilling assembly 18 and/or the logging tool 22, transmitting and receiving data, processing measurement data, and monitoring the drilling assembly 18. The processing unit 28 includes components such as a processor and a data storage device for storing, data, models and/or computer programs or software. Various techniques may be used to transmit data and communications to the processing unit 28, such as mud pulse, electromagnetic, acoustic telemetry, or wired pipe.

Figure 2:
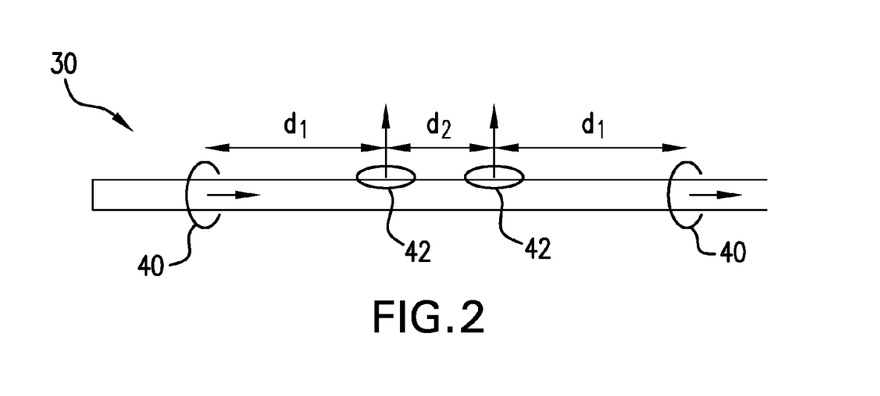
FIG. 2 illustrates an exemplary measurement tool including one or more azimuthal resistivity sensors.

In one embodiment, the logging tool 22 includes one or more sensors or measurement devices 30 configured to measure resistivity of the formation. FIG. 2 illustrates an example of the sensor 30, which includes inductive transmitters and receivers. This configuration is suitable for an inductive azimuthal resistivity tool. The sensor 30 includes two transmitters 40 (e.g., transmitter coils) whose dipole moments are parallel to the sensor, tool or borehole string longitudinal axis direction and two receivers 42 (e.g., receiver coils) that are perpendicular to the transmitter direction. When a first transmitter 40 fires, the two receivers 42 measure the magnetic field produced by the induced current in the formation 16. A second transmitter 40 is then fired, and the receivers 42 measure the resultant magnetic field. The measured signals can be combined as follows:

$$H_{T1} = H_2 - (d_1/(d_1+d_2))^3 \cdot H_1$$

$$H_{T2} = H_1 - (d_1/(d_1+d_2))^3 \cdot H_2$$

Here, $H_1$ and $H_2$ are the measurements from the first and second receivers 42, respectively, and the distances $d_1$ and $d_2$ are as shown in FIG. 2. The tool 22 rotates with the BHA and makes measurements at a plurality of angular orientations. The orientations may be equally spaced over a 360° rotation, e.g., 16 angular orientations that are 22.5° apart. The measurement depth is at the center of the two receivers 42. It should further be noted that using well known rotation of coordinates, the method of the present invention also works with various combinations of measurements as long as they can be rotated to give the principal cross components.

It is noted that the tools described herein are exemplary and are not limited to the configurations described herein. For example, the tool may include a single transmitter and receiver or any number of transmitters and receivers. In other examples, the tool includes multi-dimensional receivers and transmitters, such as 3D transmitters including orthogonal (x, y, z) transmitters and receivers. In addition, the tools described herein can operate at any suitable frequency, and are not limited to the frequencies described herein. For example, the tool 22 may operate at frequencies of 100 KHz, 400 KHz and 2 MHz.

Figure 3:
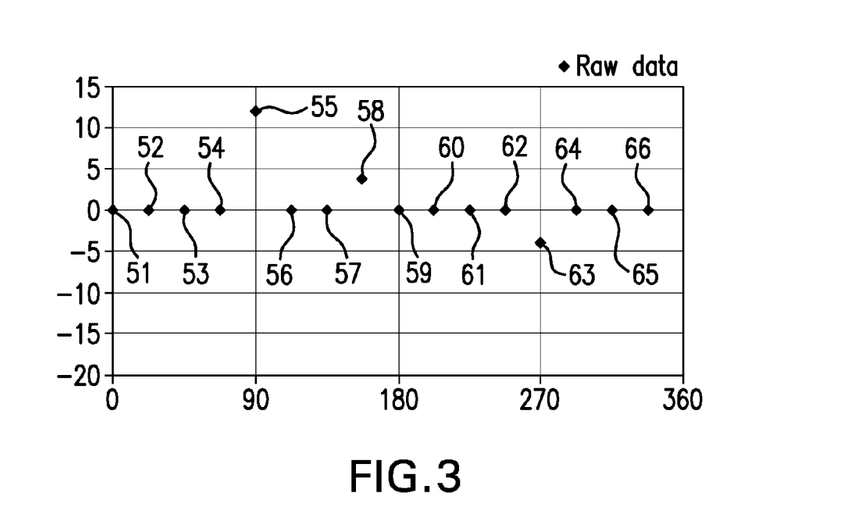
FIG. 3 illustrates exemplary signal data received by an azimuthal resistivity sensor during a logging-while-drilling (LWD) operation.

FIG. 3 illustrates exemplary signal data received by the tool 22 shown in FIG. 2 during a LWD operation. The horizontal axis shows the rotational angle which is in units of degrees. In this example, the tool 22 was rotated over 360° and measurements were attempted at each of 16 angular orientations separated by 22.5° at a selected depth. Data points 51-66 represent each orientation. The toolface angle at each measurement attempt may be measured by using a suitable orientation device such as a magnetometer or an accelerometer.

This data was taken in conditions that caused the tool to unsuccessfully transmit and measure a signal at some of the orientations. Such conditions include insufficient rotation and "stick-slip," which refers to a phenomenon in which the logging tool and/or drill bit movement is irregular due to the drill bit or tool being stuck in the borehole and then released. This results in the tool failing to generate signals from the formation that can be utilized as measurement data. During the sticking phase, the rotational rate of the tool decreases significantly as the tool and/or drill bit is stuck in the borehole. During the slip phase, as the tool is released, the rotational rate increases. Because of the irregular rotation, the tool does not acquire useful data for all sectors. In the example shown in FIG. 3, the only useful or sufficient data points that were generated are shown as data points 55, 58 and 63.

Prior art techniques typically process such data by assigning a value of zero to the missing data points (51-54, 56, 57, 59-62 and 64-66 in this example), and fitting all of the data points 51-66 to a sinusoidal curve.

Figure 4:
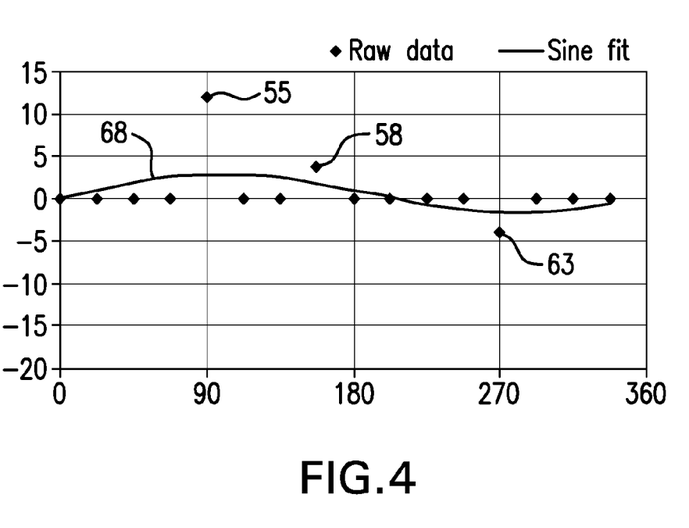
FIG. 4 illustrates results of a prior art sinusoidal curve fitting operation on the data of FIG. 4.

FIG. 4 illustrates the result of such prior art processing. Using all of the data points 51-66, in which missing data is assigned a value of zero, the data is fit to a curve 68. Based on this curve, the amplitude is estimated as 2, the angle is estimated at −10.8°, and the bias is estimated as 0.8. This is significantly different than the "true" values in this example, which are known to be amplitude=10, angle=40° and bias=5.

Figure 5:
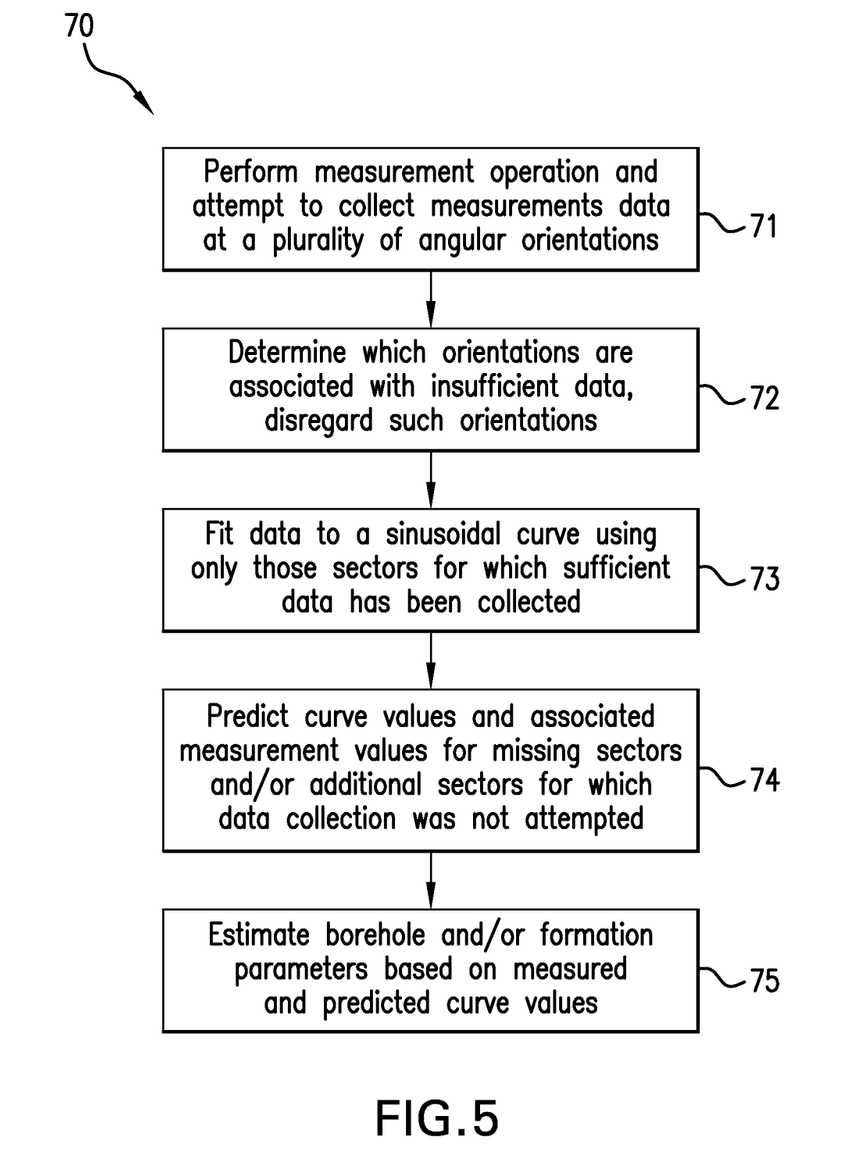
FIG. 5 is a flow chart providing an exemplary method of processing azimuthal measurement data.

FIG. 5 illustrates a method 70 of performing azimuthal measurements and analyzing azimuthal measurement data from a measurement operation such as a LWD operation. The method 70 includes one or more stages 71-75. Although the method 70 is described in some examples as being performed in conjunction with the system 10, the logging tool 22 and/or the sensors 24, the method 70 is not limited to use with these embodiments. In one embodiment, the method 70 includes the execution of all of stages 71-75 in the order described.

However, certain stages may be omitted, stages may be added, or the order of the stages changed.

Although the method 70 is described in conjunction with downhole resistivity measurements, the method 70 is not so limited. The method 70 may also be performed in conjunction with other types of downhole or surface measurements, e.g., any measurements that utilize multiple measurements performed during sensor rotation. Furthermore, the method 70 may be performed in conjunction with wireline measurement processes, LWD or MWD processes, and/or any other suitable logging processes.

In the first stage 71, a measurement operation such as a LWD operation is performed, for example, via the system 10 and the tool 22. Detection of magnetic field signals by the sensors 30 and/or receivers 42 is attempted at selected depths while the tool 22 is rotated. Each signal measurement is stored as one or more data points associated with an azimuthal orientation (also referred to as an azimuthal or angular sector) to generate raw measurement data.

In one embodiment, the resistivity tool 22 is rotated during the LWD operation and EM measurements are taken over a selected number of azimuthal sectors. For example, the tool 22 is rotated and signal measurements are attempted for 16 sectors (e.g., every 22.5 degrees of rotation). Any number of sectors or orientations may be utilized. Measurements can be attempted and/or recorded at arbitrary toolface angles or any selected tool face angles as long as the angles for each attempt are known. An exemplary data set representing measurement attempts at multiple sectors is shown in FIG. 3.

In the second stage 72, those sectors for which a measurement signal is insufficient for use as data, or for which measurement data is entirely missing, are identified. These sectors are described herein as "missing" sectors or data. For example, sectors for which no signal was detected are considered missing. In other example, data representing a signal having a magnitude or amplitude that is lower than a selected threshold can be considered missing. Such missing sectors are identified and disregarded for further processing.

In the third stage 73, selected data points representing valid or sufficient measurement signals are fit to a sinusoidal curve. The fitting is performed such that a sinusoidal function is found that fits the selected data points within a certain error. In the exemplary data set shown in FIG. 3, data for some of the 16 sectors is missing, i.e., a signal was not received for that sector, due to conditions such as non-uniform rotation, slip-stick or insufficient RPM. Only data points 55, 58 and 63 are selected for curve fitting; the remaining sectors are disregarded.

In one embodiment, if the tool 22 includes multiple sensors or transmitter/receiver couples, where a combined or compensated signal is used, the sinusoidal curve fitting is performed for each sensor before the signal is combined or compensated. Then, the sinusoidal curve fitting parameters are either combined for real-time transmitting or used at post processing.

An exemplary sinusoidal fitting algorithm is described below, in which values for the coefficient A, the value $\phi$ and the constant "c" are found that results in a curve that fits the data points. An exemplary curve is represented by:

$$y_i = A\cos(\theta_i - \phi) + c$$
$$= A\cos\phi\cos\theta_i + A\sin\phi\sin\theta_i + c,$$

where "i" is an element of the set $\{1, 2 \ldots N\}$ and "N" is the number of sectors. The fitting algorithm is not limited to the above curve. Any suitable sinusoidal curve may be used. In addition, other curves may be used (e.g., exponential), depending on the type of measurements performed.

For a 16 sector measurement, in which sufficient data points are collected for each sector, $i \in \{1, 2 \ldots 16\}$. For measurements where some sectors have been disregarded, N is equal to the number of remaining data points, i.e., only the selected data points. In the example shown in FIG. 3, N=3 and corresponds to the data points 55, 58 and 63. $y_i$ can be expressed as a system of equations, for example:

$$\begin{cases} \sum y_i = \sum \cos\theta_i \cdot A\cos\phi + \sum \sin\theta_i \cdot A\sin\phi + Nc, \ 3 \leq N \leq 16 \\ \sum y_i\cos\theta_i = \sum \cos^2\theta_i \cdot A\cos\phi + \sum \sin\theta_i\cos\theta_i \cdot A\sin\phi + \sum \cos\theta_i \cdot c \\ \sum y_i\sin\theta_i = \sum \sin\theta_i\cos\theta_i \cdot A\cos\phi + \sum \sin^2\theta_i \cdot A\sin\phi + \sum \sin\theta_i \cdot c \end{cases}$$

As is shown, this system includes three equations with three unknowns. The unknowns in this embodiment include the constant "A", which corresponds to the amplitude of the sinusoidal signal, "$\phi$", which corresponds to the phase offset and is indicative of the direction to a bed boundary, and "c," which can be affected by bias in the measurements.

The equations can be solved using matrix techniques. For example, the equations can be represented by the following matrix equation:

$$\begin{pmatrix} \sum y_i \\ \sum y_i\cos\theta_i \\ \sum y_i\sin\theta_i \end{pmatrix} = \begin{pmatrix} \sum \cos\theta_i & \sum \sin\theta_i & N \\ \sum \cos^2\theta_i & \sum \sin\theta_i\cos\theta_i & \sum \cos\theta_i \\ \sum \sin\theta_i\cos\theta_i & \sum \sin^2\theta_i & \sum \sin\theta_i \end{pmatrix} \begin{pmatrix} A\cos\phi \\ A\sin\phi \\ c \end{pmatrix}$$

$$\vec{D} \qquad = \qquad M \qquad \vec{S}$$

where $$\vec{S} = \begin{pmatrix} s_1 \\ s_2 \\ s_3 \end{pmatrix}.$$

S, representing the coefficients of the above equations (i.e., $s_1 = A\cos\phi$, $s_2 = A\sin\phi$ and $S_3 = c$) can be obtained, for example, using Cramer's rule. The values for A, $\phi$ and c can thus be solved using:

$$A = \sqrt{s_1^2 + s_2^2},$$
$$\phi = \tan^{-1}\frac{s_2}{s_1},$$

and $$c = s_3.$$

In some embodiments, if the tool 22 includes multiple transmitters/receivers, each set of data from a respective receiver is separately fit to a selected sinusoidal curve, and the results are combined to calculate the curve. For example, using the above algorithm for two transmitters $T_1$ and $T_2$, each set of data is fit to the above curve and values of A, $\phi$ and c are calculated separately. For $T_1$ data, the values are denoted as $A_1$, $\phi_1$ and $c_1$, and for $T_2$ data, the values are denoted as $A_2$, $\phi_2$ and $c_2$. Then overall values for A, φ and c are calculated as follows:

$$A = \sqrt{(A_1\cos\phi_1 + A_2\cos\phi_2)^2 + (A_1\sin\phi_1 + A_2\sin\phi_2)^2}/2$$

$$\theta = \tan^{-1}((A_1\sin\phi_1 + A_2\sin\phi_2)/(A_1\cos\phi_1 + A_2\cos\phi_2))$$

$$c = (c_1 + c_2)/2$$

The above algorithm can be modified for various conditions. For example, if N=2 (i.e., only two sectors yield valid or sufficient data), the value for φ is taken from the closest preceding depth. $y_i$ can again be expressed as a system of equations, for example:

$$\begin{cases} \sum y_i = \left(\sum \cos\theta_i \cos\phi + \sum \sin\theta_i \sin\phi\right) \cdot A + Nc, \ N = 2 \\ \sum y_i \cos\theta_i = \left(\sum \cos^2\theta_i \cos\phi + \sum \sin\theta_i \cos\theta_i \sin\phi\right) \cdot A + \sum \cos\theta_i \cdot c \\ \sum y_i \sin\theta_i = \left(\sum \sin\theta_i \cos\theta_i \cos\phi + \sum \sin^2\theta_i \sin\phi\right) \cdot A + \sum \sin\theta_i \cdot c \end{cases}$$

These equations can be represented by the following matrix equation:

$$\begin{pmatrix} \sum y_i \\ \sum y_i\cos\theta_i \\ \sum y_i\sin\theta_i \end{pmatrix} = \begin{pmatrix} \cos\phi\sum\cos\theta_i + \sin\phi\sum\sin\theta_i & N \\ \cos\phi\sum\cos^2\theta_i + \sin\phi\sum\sin\theta_i\cos\theta_i & \sum\cos\theta_i \\ \cos\phi\sum\sin\theta_i\cos\theta_i + \sin\phi\sum\sin^2\theta_i & \sum\sin\theta_i \end{pmatrix} \begin{pmatrix} A \\ c \end{pmatrix}$$

$$\vec{D} = M \quad \vec{S}$$

where $$\vec{S} = \begin{pmatrix} s_1 \\ s_2 \end{pmatrix}$$

S, representing the coefficients of the above equations (i.e., $s_1$=A and $s_2$=c), can be obtained, for example, using Cramer's rule.

If N=1 (i.e., only a single sector yields valid or sufficient data) all values of A, φ and c can be taken from a previous depth. This condition may occur, for example, if the tool 22 is mostly sticked. If N=zero, no data has been received and the measurement attempt for the present rotation and depth can be neglected.

In the fourth stage 74, the results of the curve fitting using the selected data points are used to estimate or predict the values for the missing sectors. In addition, the results may be used to estimate or predict values associated with sectors for which measurements were not attempted.

It is noted that, if all of the sectors include valid measurement data, then any suitable solving algorithm can be used. For example, if N=16, then a curve fitting is done to the measured values of the receiver signal as a function of toolface angle. In this example, measurements are attempted sixteen times over a single 360° rotation. Denoting by $f_i$ the measured signal at toolface angle $\theta_i$, the following quantities are computed:

$$\mathcal{R} = \frac{1}{\pi}\sum_{i=1}^{16} f_i\cos\theta_i,$$

$$\mathcal{J} = \frac{1}{\pi}\sum_{i=1}^{16} f_i\sin\theta_i,$$

-continued $$\Phi = \tan^{-1}\left(\frac{\mathcal{J}}{\mathcal{R}}\right),$$

$$A = \sqrt{\mathcal{R}^2 + \mathcal{J}^2},$$

and $$f_i^* = f_i - \frac{1}{16}\sum_{i=1}^{16} f_i.$$

where the following term:

$$\frac{1}{16}\sum f_i$$

represents the bias in the measurements.

Figure 6:
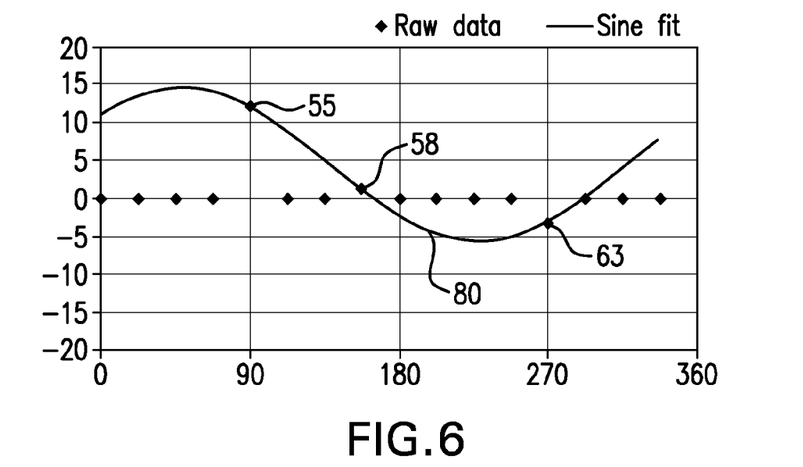
FIG. 6 illustrates results of a sinusoidal curve fitting operation on the data of FIG. 4 performed according to the method of FIG. 6.

FIG. 6 shows the results of the method described herein, in which the curve is fitted to the data points at sectors 55, 58 and 63, and in which the missing sectors are entirely excluded from the fitting analysis. The results of the curve show much greater correlation with the actual or true values; the values for this curve are estimated as: amplitude=9.8, angle=36.4 and bias=3.7.

In the fifth stage 75, borehole and/or formation parameters are estimated based on the measurement values estimated or predicted using the above analysis. For example, the magnitude of the measured magnetic field is used to estimate a resistivity of the surround formation as well as locating boundaries between regions of the formation having different resistivities.

The systems and methods described herein provide various advantages over prior art techniques. For example, more accurate estimates of azimuthal measurements (e.g., azimuthal propagation resistivity measurements) are achieved by providing an improved sinusoidal fitting algorithm for measurement data that has missing azimuthal sectors. Such systems and methods are an improvement over prior art techniques, which typically assign zeros to those missing sectors in sinusoidal curve fitting of azimuthal measurements. The fitting procedure described herein smoothes the effect of random noise and greatly reduces the effect of tool bias, including the effect of missing or invalid raw records in some of the azimuthal sectors.

Figure 7:
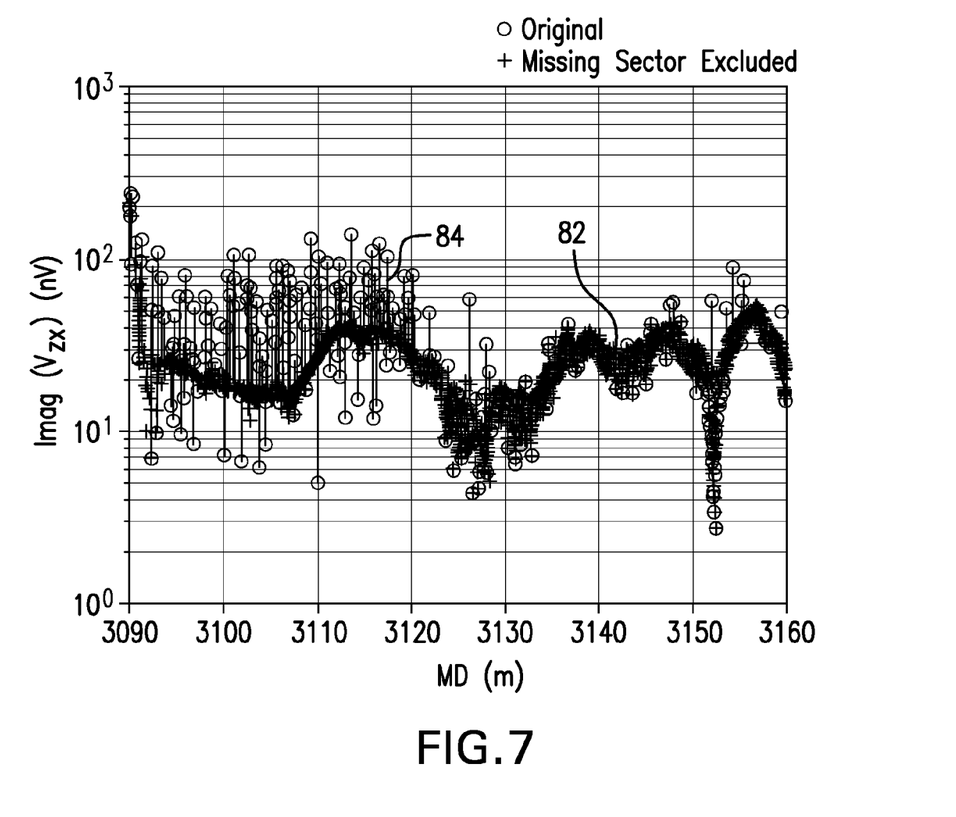
FIG. 7 shows azimuthal resistivity data processed according to embodiments described herein and data processed according to prior art techniques.

FIG. 7 shows examples of received data that has been processed using the embodiments described herein, as compared to data processed according to prior art techniques. FIG. 7 is a chart showing the imaginary amplitude ("Imag($V_{zx}$)") of signals generated by a rotating resistivity tool such as the sensor 30. In these examples, the tool has a longitudinal "z" axis and the receivers are oriented in a direction "x" perpendicular to the z-axis. The vertical axis of the chart represents the Imag($V_{zx}$) signal in nano-volts (nV) and the horizontal axis of the chart represents the measured depth (MD) in meters of each amplitude signal.

In this example, the curve 82 represents data processed according to the embodiments described herein, and the curve 84 represents data processed according to prior art techniques. As can be seen in these examples, the embodiments described herein produce data that is much smoother and of a higher quality than prior art results.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 26 or the processing unit 28. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

What is claimed is:

1. A method of processing azimuthal measurement data, the method comprising:
   receiving a plurality of data values generated by a rotating measurement tool, the measurement tool including at least one measurement sensor and configured to rotate and measure a signal at each of a plurality of azimuthal orientations;
   associating each received data value with an azimuthal orientation;
   selecting one or more azimuthal orientations associated with data values that are useful as measurement data;
   prior to performing a curve fit, disregarding azimuthal orientations associated with one or more missing data values or one or more data values that are not useful as measurement data; and
   fitting only the data values associated with the selected one or more azimuthal orientations to a sinusoidal curve.

2. The method of claim 1, further comprising disposing the measurement tool in a borehole in an earth formation and generating the measurement data during rotation of the measurement tool.

3. The method of claim 1, wherein the measurement sensor is an azimuthal resistivity sensor configured to inject a magnetic field into an earth formation and measure a resulting magnetic field generated in the formation.

4. The method of claim 1, wherein disregarding includes disregarding one or more data values that are lower than a selected threshold.

5. The method of claim 1, wherein fitting includes estimating the sinusoidal curve ($y_i$) by calculating a coefficient "A", an angle "φ" and a constant "c" based on the following equation:

$$y_i = A\cos(\theta_i - \phi) + c$$
$$= A\cos\phi\cos\theta_i + A\sin\phi\sin\theta_i + c,$$

where $\theta_i$ is an angle corresponding to the azimuthal orientation associated with each selected data value, and φ is an angle corresponding to a phase offset.

6. The method of claim 5, wherein calculating includes expressing $y_i$ as the following system of equations:

$$\begin{cases} \sum y_i = \sum \cos\theta_i \cdot A\cos\phi + \sum \sin\theta_i \cdot A\sin\phi + Nc, \\ \sum y_i\cos\theta_i = \sum \cos^2\theta_i \cdot A\cos\phi + \sum \sin\theta_i\cos\theta_i \cdot A\sin\phi + \sum \cos\theta_i \cdot c \\ \sum y_i\sin\theta_i = \sum \sin\theta_i\cos\theta_i \cdot A\cos\phi + \sum \sin^2\theta_i \cdot A\sin\phi + \sum \sin\theta_i \cdot c, \end{cases}$$

wherein "N" is equal to a number of selected data values.

7. The method of claim 6, wherein calculating includes:
representing the system of equations by the following matrix equation:

$$\begin{pmatrix} \sum y_i \\ \sum y_i\cos\theta_i \\ \sum y_i\sin\theta_i \end{pmatrix} = \begin{pmatrix} \sum \cos\theta_i & \sum \sin\theta_i & N \\ \sum \cos^2\theta_i & \sum \sin\theta_i\cos\theta_i & \sum \cos\theta_i \\ \sum \sin\theta_i\cos\theta_i & \sum \sin^2\theta_i & \sum \sin\theta_i \end{pmatrix} \begin{pmatrix} A\cos\phi \\ A\sin\phi \\ c \end{pmatrix}$$

$$\vec{D} \quad = \quad M \quad \vec{S}$$

wherein $$\vec{S} = \begin{pmatrix} s_1 \\ s_2 \\ s_3 \end{pmatrix},$$

and wherein $s_1 = A\cos\phi$, $s_2 = A\sin\phi$ and $s_3 = c$; and calculating values of A, φ and c based on:

$$A = \sqrt{s_1^2 + s_2^2},$$

$$\phi = \tan^{-1}\frac{s_2}{s_1},$$

and $$c = s_3.$$

8. The method of claim 5, wherein the number of selected data values is two, and estimating the curve includes:

taking a value of φ from a previously estimated value of φ;
expressing $y_i$ as the following system of equations:

$$\begin{cases} \sum y_i = \left(\sum \cos\theta_i \cos\phi + \sum \sin\theta_i \sin\phi\right) \cdot A + Nc, N = 2 \\ \sum y_i \cos\theta_i = \left(\sum \cos^2\theta_i \cos\phi + \sum \sin\theta_i \cos\theta_i \sin\phi\right) \cdot A + \sum \cos\theta_i \cdot c \\ \sum y_i \sin\theta_i = \left(\sum \sin\theta_i \cos\theta_i \cos\phi + \sum \sin^2\theta_i \sin\phi\right) \cdot A \sum \sin\theta_i \cdot c; \end{cases}$$

representing the system of equations as:

$$\begin{pmatrix} \sum y_i \\ \sum y_i \cos\theta_i \\ \sum y_i \sin\theta_i \end{pmatrix} = \begin{pmatrix} \cos\phi \sum \cos\theta_i + \sin\phi \sum \sin\theta_i & N \\ \cos\phi \sum \cos^2\theta_i + \sin\phi \sum \sin\theta_i \cos\theta_i & \sum \cos\theta_i \\ \cos\phi \sum \sin\theta_i \cos\theta_i + \sin\phi \sum \sin^2\theta_i & \sum \sin\theta_i \end{pmatrix} \begin{pmatrix} A \\ c \end{pmatrix}$$

$$\vec{D} \quad = \quad M \quad \vec{S}$$

wherein $$\vec{S} = \begin{pmatrix} s_1 \\ s_2 \end{pmatrix},$$

$s_1 = A$ and $s_2 = c$.

9. The method of claim 1, wherein the measurement tool includes a plurality of sensors, and fitting includes separately fitting a set of selected data values for each sensor to the curve, and combining the results of each separate fitting to estimate the curve.

10. A method of processing azimuthal measurement data, the method comprising:
receiving a plurality of data values generated by a rotating measurement tool, the measurement tool including at least one measurement sensor and configured to rotate and measure a signal at each of a plurality of azimuthal orientations;
associating each received data value with an azimuthal orientation;
selecting one or more azimuthal orientations associated with data values that are useful as measurement data;
prior to performing a curve fit, disregarding azimuthal orientations associated with one or more missing data values or one or more data values that are not useful as measurement data;
fitting only the data values associated with the selected one or more azimuthal orientations to a sinusoidal curve; and
predicting, based on the sinusoidal curve, values for at least one of the disregarded azimuthal orientations and additional azimuthal orientations for which measurements were not attempted.

11. A system for imaging a formation surrounding a wellbore during a drilling operation, the system comprising:
a drill string comprising a downhole measurement tool configured to rotate, the downhole measurement tool including at least one measurement sensor and configured to measure a signal at each of a plurality of azimuthal orientations; and
a processor configured to perform:
receiving a plurality of data values generated by the measurement tool;
associating each received data value with an azimuthal orientation;
selecting one or more azimuthal orientations associated with one or more data values that are useful as measurement data;
prior to performing a curve fit, disregarding azimuthal orientations associated with one or more missing data values or one or more data values that are not useful as measurement data; and
fitting only the data values associated with the one or more selected azimuthal orientations to a sinusoidal curve.

12. The system of claim 11, wherein the processor is configured to further perform predicting, based on the sinusoidal curve, values for at least one of the disregarded azimuthal orientations and additional azimuthal orientations for which measurements were not attempted.

13. The system of claim 11, wherein the measurement sensor is an azimuthal resistivity sensor configured to inject a magnetic field into an earth formation and measure a resulting magnetic field generated in the formation.

14. The system of claim 11, wherein disregarding includes disregarding one or more data values that are lower than a selected threshold.

15. The system of claim 11, wherein fitting includes estimating the sinusoidal curve ($y_i$) by calculating a coefficient "A", an angle "φ" and a constant "c" based on the following equation:

$$y_i = A\cos(\theta_i - \phi) + c$$
$$= A\cos\phi\cos\theta_i + A\sin\phi\sin\theta_i + c,$$

where $\theta_i$ is an angle corresponding to the azimuthal orientation associated with each selected data value, and φ is an angle corresponding to a phase offset.

16. A computer program product for processing measurement data, the computer program product including a non-transitory tangible storage medium readable by a processing circuit and storing instructions for execution by the processing circuit for performing a method comprising:
receiving a plurality of data values generated by a rotating measurement tool, the measurement tool including at least one measurement sensor and configured to rotate and measure a signal at each of a plurality of azimuthal orientations;
associating each received data value with an azimuthal orientation;
selecting one or more azimuthal orientations associated with one or more data values that are useful as measurement data;
prior to performing a curve fit, disregarding azimuthal orientations associated with one or more missing data values or one or more data values that are not useful as measurement data; and
fitting only the data values associated with the selected one or more azimuthal orientations to a sinusoidal curve.

17. The computer program product of claim 16, further comprising predicting, based on the sinusoidal curve, values for at least one of the disregarded azimuthal orientations and additional azimuthal orientations for which measurements were not attempted.

18. The computer program product of claim 16, further comprising disposing the measurement tool in a borehole in an earth formation and generating the measurement data during rotation of the measurement tool.

19. The computer program product of claim 16, wherein the measurement sensor is an azimuthal resistivity sensor configured to inject a magnetic field into an earth formation and measure a resulting magnetic field generated in the formation.

20. The computer program product of claim 16, wherein disregarding includes disregarding one or more data values that are lower than a selected threshold.

\* \* \* \* \*